Feb. 17, 1931.  A. PETERS  1,793,189
APPARATUS FOR THE RECOVERY OF MEAT FROM BACKBONES OF FISHES
Filed Dec. 16, 1929   4 Sheets-Sheet 1

Inventor
Anton Peters
By Mawhinney & Mawhinney
Attorneys.

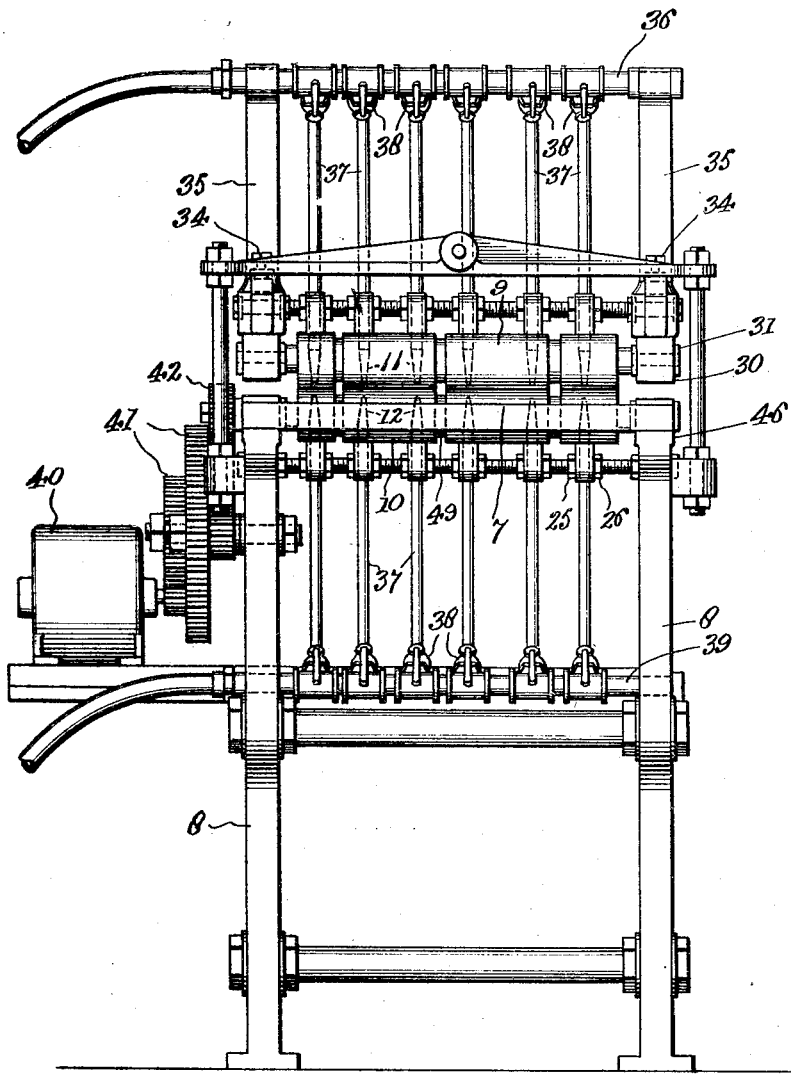

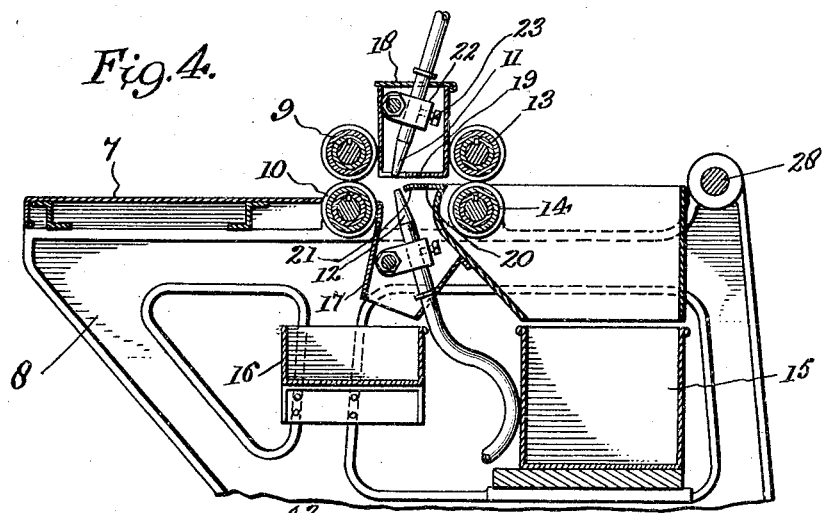
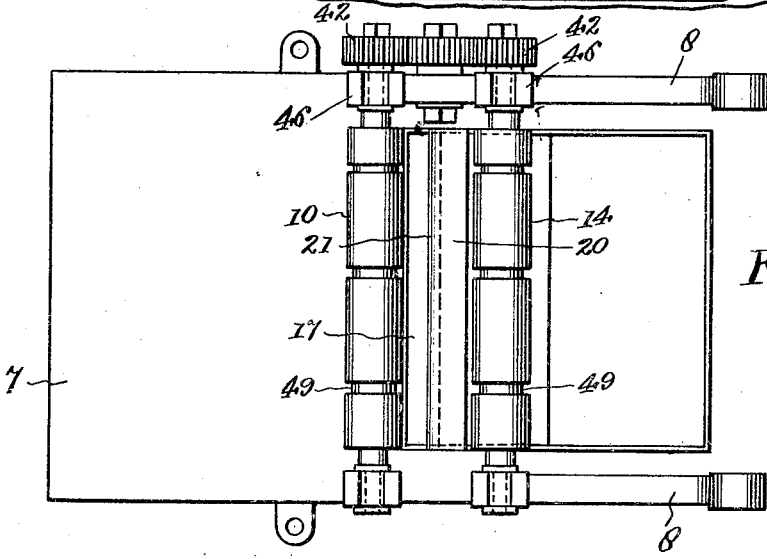
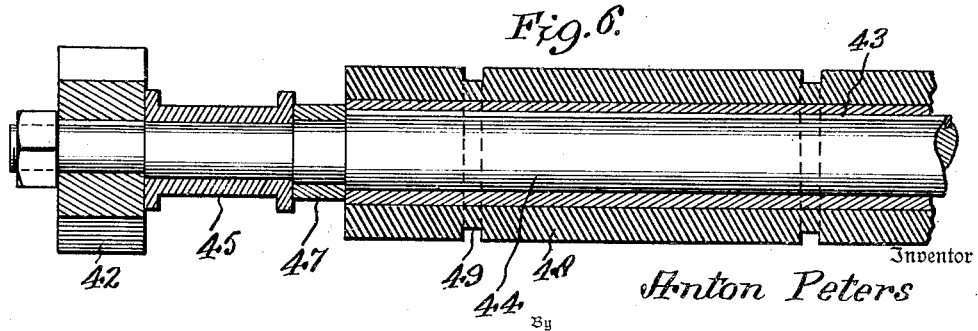

Patented Feb. 17, 1931

1,793,189

UNITED STATES PATENT OFFICE

ANTON PETERS, OF EVERETT, WASHINGTON

APPARATUS FOR THE RECOVERY OF MEAT FROM BACKBONES OF FISHES

Application filed December 16, 1929. Serial No. 414,530.

The present invention relates to improvements in method of and apparatus for recovery of meat from backbones of fishes and has for an object to provide an economical and efficient method and apparatus for the removal of that residue of meat which clings to the backbone and rib bones of the fish even after the "peeling" operation.

In the mild curing of salmon, the packers "peel" the sides of a fish from the backbone as close as possible with a knife, after which the backbone of the fish is sold at a nominal price to the fertilizer industry.

A very considerable portion of meat adheres to, or is lodged between, the fish bones connected with the fish backbone; and it is the primary object of the invention to remove this meat for edible purposes.

With the foregoing and other objects in view, the invention will be more fully described hereinafter, and will be more particularly pointed out in the claims appended hereto.

In the drawings, wherein like symbols refer to like or corresponding parts throughout the several views.

Figure 3 is a front view of the apparatus.

Fig. 4 is a vertical section taken on the line 4—4 in Figure 1.

Figure 5 is a top plan view of the table, frame and lower set of rollers, and

Figure 6 is a fragmentary longitudinal sectional view on an enlarged scale through one of the lower rollers and its drive pinion.

Figure 1:
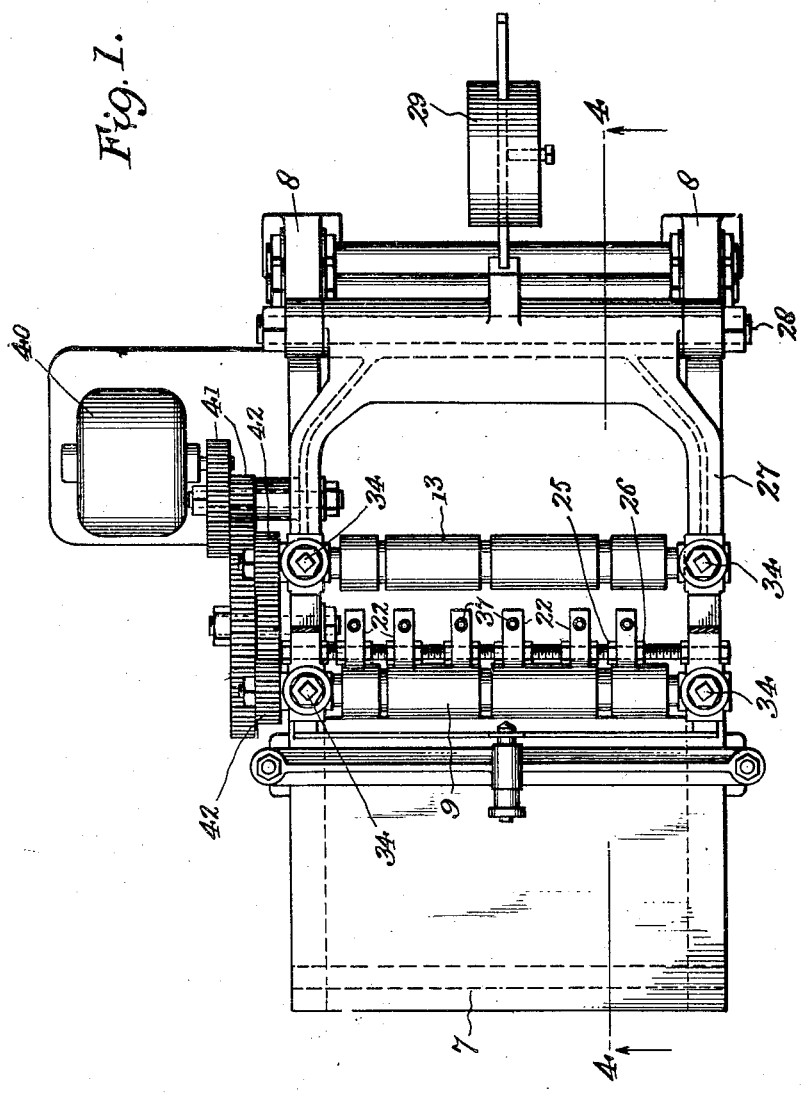
Figure 1 is a top plan view of one form of apparatus constructed in accordance with the present invention, and with the top row of air nozzles broken away.
Figure 2:
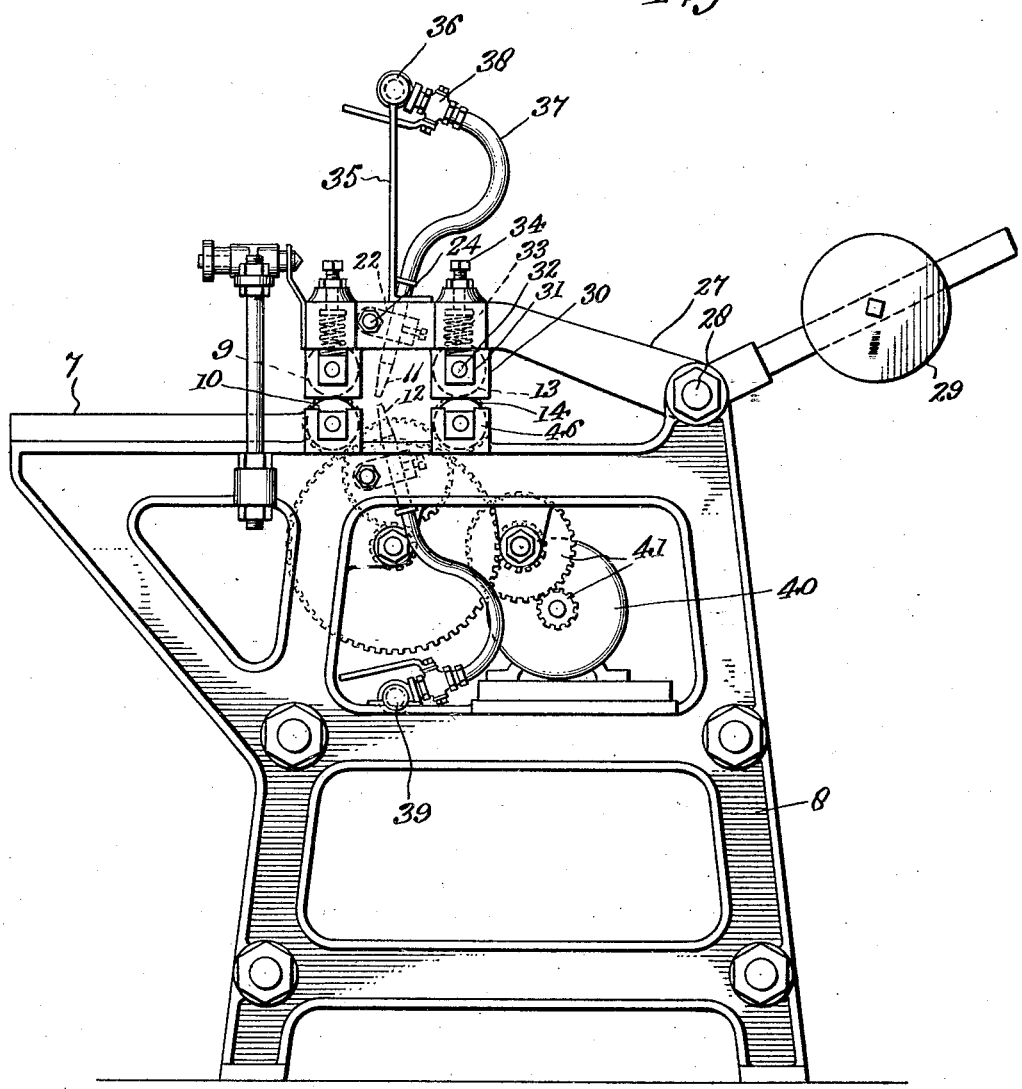
Figure 2 is a side elevation of the same.

Referring more particularly to the drawings the improved method consists in,

First: Exposing such portions of the backbone which carry coagulated blood, to a suitable blast of air to remove such blood.

Second: Subjecting the meat-covered backbone to a suitable air or water blast which removes the meat from the backbone.

Third: Trapping the fish meat from the air stream.

The first step can of course be replaced by brush and water treatment to remove the blood.

The second step can be replaced by a squeezing operation, if desired, which will be more fully described hereinafter in connection with the apparatus. The fish bone, after being cleaned of superficial blood, may be sent through squeezing rollers of rubber or other suitable material and the meat thus separated from the bone.

In the event just referred to, the third step would involve simply a case of gathering, in a hopper or pan, the meat from said squeezing operation.

In the apparatus for carrying out the above process, a table 7 is mounted upon an appropriate frame 8 and is adapted to initially receive the fish bones, which have been subjected to the "peeling" operation and to which a certain residue of meat still adheres. The fish bone is adapted to be passed through a set of rollers comprising an upper roller 9 and a lower roller 10.

The fish bone is also subsequently passed between upper and lower sets of nozzles 11 and 12 and finally between the rollers 13 and 14, from which the bone, from which all of the meat has been recovered, is deposited in a receptacle 15. The meat recovered is caught either on the table 7 or in a receptacle 16, carried by the frame 8, to which the meat is guided by a combined hopper and housing 17, which both encloses the lower set of nozzles 12 and acts to deflect the meat into the receptacle 16. A housing 18 is provided about the upper sets of nozzles 11; such housings having guide walls 19 and 20 spaced apart to form a passage-way in alignment with the bights of the forward and rear set of rollers. The lower guide wall 20 has its forward end deflected downwardly as indicated at 21 to direct the fish bone into the passage between such guide walls.

The guide walls 19 and 20 terminate short of the front walls of the housings in order to provide gaps in the adjacent portions of the housings through which the jets or streams of fluid under pressure may be directed against the backbone during its passage between the rolls.

The nozzles are carried by blocks 22 which are provided with openings through which the nozzles may be adjustably fitted toward and from one another and held in the adjusted position by the use of set screws 23. The blocks 22 are fitted about threaded rods 24 and such rods carry pairs of lock nuts 25 and 26 to engage upon opposite sides of each block 22 whereby to hold the same in the adjusted position; it being understood that the blocks 22 have a swinging movement about the rods 24 as a center or fulcrum; and in this way the angularity or the relative angular positions of the nozzles may be changed, as desired.

The lower rod may be carried in the framework of the machine or in any other appropriate support. The upper rod is preferably mounted in the side arms of a yoke 27, which yoke carries the entire upper assembly including the upper rolls 9 and 13 and the upper nozzles 11 and adjacent parts.

The yoke 27 is fulcrumed at 28 on the machine frame and is provided with an adjustable counter-balance 29. The bearings and the upper rolls are indicated at 30, these bearings being slotted to slidably receive the vertically movable blocks 31 carrying the trunnions 32 of the upper rollers. Coil springs 33 in the bearings act to move the bearing blocks and the upper rollers down upon the lower rollers 10 and 14. The tension of the springs 33 may be adjusted by set screws 34. The yoke also carries a number of brackets 35 for supporting the air or fluid pipe 36 which extends in common to all of the nozzles, a flexible hose 37 having a valve 38 being connected between each nozzle and its supply pipe 36. The pipe 36 is in communication with any suitable source of air or fluid pressure supply.

In a similar way the lower set of nozzles 12 is in communication with a transversely extending air or fluid pressure supply pipe 39.

The various rollers may be driven by any appropriate power, for instance by the electric motor 40 installed on the frame and connected, by a suitable train of gears 41, to the pinions 42 on the lower rollers 10 and 11. The lower rollers drive the upper rollers through frictional contact or through frictional pressure through the material operated on.

Referring more particularly to Figure 6, one of the lower rollers is herein shown to consist of a sleeve 43 affixed in any appropriate manner to a drive shaft 44 which is affixed in turn to a drive pinion 42. Extending about the shaft is a bearing sleeve 45 adjacent the pinion 42 for the purpose of mounting the shaft and the roller in bearings 46 on the frame 8. A spacing collar 47 is mounted on the shaft 44 between the bearing sleeve 45 and the roller. The rollers are preferably composed of soft rubber bodies 48 which will be deformable on contact with the fish bone and flow into and about the various bones to expel the meat therefrom. Circumferential grooves 49 may be provided in the soft roll bodies 48 if desired; or these grooves may be entirely omitted.

In the use of the device, the fish meat may be rolled out from the fish bone in the first set of rollers 9 and 10, the meat deposited on the table 7 in front of the rollers, while the fish bone goes through into a suitable receptacle 15. In this case the receptacle 15 may be set immediately behind the first set of rollers, and the air nozzles and second set of rollers may be dispensed with. Where two sets of rollers are used, such as shown in the drawings, only a very light pressure is required to guide and drive the fish bone forward, while the air stream would be used to remove the meat.

On the other hand, a good portion of the meat may be removed by pressure rolling in the first set of rolls 9 and 10; and the remaining portion removed by the air stream furnished by the nozzles. This latter scheme would have the advantage of economy of compressed air, but would have the disadvantage of squeezing out some blood from the backbone and mixing it with the meat. The blood, while not objectionable as a food, nevertheless makes the appearance of the food less attractive.

With the method of removal of the meat by the air stream, only very light pressure would be applied on the backbone, and it would therefor not give up the blood it contains.

The meat may also be removed by pressure in a suitable set of dies in a punch press, in which case the die would be made of a suitable rubber material to allow for the deflection or distortion in and about the bones of the meat to release and recover the meat from the bones.

The idea of subjecting the meat-covered bone to a flexible pressure might be carried out in many other mechanical ways.

The grooves 49 in the rollers may not be necessary under all conditions, as for instance in handling of quite small fishes.

The tips of the nozzles 11 and 12 may be brought very close to the backbone which is passed through the device by adjustment of the set screws 23, and the nozzles also may be directed at an appropriate angle about the shafts 24 for the purpose of more effectively dislodging the meat from between the bones. The air blasts from the upper and lower nozzles will preferably impinge together upon the bone at an angle so as to cause a lateral blast in addition to the blasts from above and from below and in this way to drive out the meat from between the rib bones. The housings will prevent the meat from being blown about and will entrap the same, the meat falling into quiescent zones between the nozzles and being precipitated by gravity into the receptacle 16 below.

It is obvious that various changes and modifications may be made in the details of construction and design of the above specifically described embodiment of this invention without departing from the spirit thereof, such changes and modifications being restricted only by the scope of the following claims.

What is claimed is:—

1. In an apparatus for the recovery of fish meat from bones, a frame, a table thereon to initially receive the fish bones, a pair of pressure driven flexible rollers carried by said frame adjacent the table for initially receiving the bones and so positioned that the rejected meat will be caught by said table, a series of angularly and vertically adjustable fluid pressure nozzles carried by the frame adjacent said pressure rolls, housings extending about said nozzles, the lower housing having an opening in its lower portion and acting as a hopper, a receptacle for the fish meat below said lower housing, a second pair of rolls in rear of the housings for receiving the cleaned fish bone, and a receptacle carried by the frame in rear of the second set of rolls for the deposit of fish bones.

2. In an apparatus of the kind described, a frame, a table thereon, a set of rolls adjacent the table having soft rubber peripheral portions pressed yieldably into contact, an upper and lower set of angularly adjustable fluid pressure nozzles disposed adjacent said rolls, a second set of rolls behind the nozzles adapted to pull the backbone through the apparatus, and means to drive said rolls.

3. In an apparatus for the recovery of meat from fish bones, a frame, a table thereon, spaced lower rolls mounted on the frame, a pivoted yoke mounted on the frame, upper resilient pressure rolls carried by said yoke above the lower rolls and co-operating therewith, fluid pressure nozzles mounted and adjustable from and toward each other between said rolls, and means to catch the separated fish meat and bones.

4. In an apparatus for the recovery of meat from fish bones, a frame, a table mounted thereon, a first set of pressure rolls on the frame adjacent the table, a second set of pressure rolls on the frame spaced from the first set of rolls, longitudinally and angularly adjustable blast nozzles carried between said rollers, housings extending about the nozzles and having adjacent spaced guide walls with gaps forwardly of the guide walls, a receptacle below the lower housing for receiving the separated fish meat, and a receptacle in rear of the second set of rollers for receiving the fish bones.

In testimony whereof I affix my signature.

ANTON PETERS.